(12) United States Patent
Taguchi et al.

(10) Patent No.: US 7,257,463 B2
(45) Date of Patent: Aug. 14, 2007

(54) TRAVELING BODY SYSTEM, AUTOMATED STORAGE AND RETRIEVAL SYSTEM, AND METHOD FOR CONTROLLING TRAVELING BODY

(75) Inventors: Kazuhiro Taguchi, Aichi-ken (JP); Yuichi Ueda, Aichi-ken (JP)

(73) Assignee: Daifuku Co., Ltd., Osaki-shi, Osaka (JP)

( * ) Notice: Subject to any disclaimer, the term of this patent is extended or adjusted under 35 U.S.C. 154(b) by 175 days.

(21) Appl. No.: 10/793,226

(22) Filed: Mar. 5, 2004

(65) Prior Publication Data
US 2004/0184901 A1 Sep. 23, 2004

(30) Foreign Application Priority Data
Mar. 7, 2003 (JP) .................... P.2003-060722

(51) Int. Cl.
*G06F 7/00* (2006.01)
(52) U.S. Cl. .............. 700/214; 700/213; 414/279
(58) Field of Classification Search .......... 700/213, 700/214; 414/279, 281, 266, 269, 270, 277
See application file for complete search history.

(56) References Cited

U.S. PATENT DOCUMENTS

| | | | | |
|---|---|---|---|---|
| 4,299,496 A | * | 11/1981 | Lord ...................... 356/446 |
| 4,411,577 A | * | 10/1983 | Shearer, Jr. ................ 414/274 |
| 5,655,870 A | * | 8/1997 | Yasuhara et al. ........... 414/273 |
| 5,798,920 A | * | 8/1998 | Crucius et al. ............... 700/66 |
| 6,192,294 B1 | * | 2/2001 | Chiba ...................... 700/214 |
| 6,467,582 B1 | * | 10/2002 | Nakashima et al. ........ 187/244 |
| 6,484,849 B2 | * | 11/2002 | Vecchiotti et al. ......... 187/393 |
| 6,554,107 B2 | * | 4/2003 | Yumura et al. ............ 187/247 |
| 7,054,716 B2 | * | 5/2006 | McKee et al. .............. 700/245 |
| 2004/0151568 A1 | * | 8/2004 | Bellchambers .............. 414/699 |

FOREIGN PATENT DOCUMENTS

| | | |
|---|---|---|
| JP | 2000-229706 | 8/2000 |
| JP | 2000-351411 | 12/2000 |
| JP | 2000-351412 | 12/2000 |
| JP | 2000-351414 | 12/2000 |
| JP | 2001-163408 | 6/2001 |

OTHER PUBLICATIONS

US Translation of 2000-229706, Taguchi Kazuhiro, Aug. 22, 2000.*

* cited by examiner

*Primary Examiner*—Khoi H. Tran
(74) *Attorney, Agent, or Firm*—McGinn IP Law Group, PLLC

(57) ABSTRACT

A travel distance-measuring unit measures optically a distance to a stacker crane by a travel distance-measuring sensor provided at a reference measuring position between the stacker crane that can travel on a predetermined route along a travel rail and a ceiling rail and the reference measuring position set on the ground side. A lift distance-measuring unit measures optically a distance to a lift table by a lift distance-measuring sensor provided at the reference measuring position via reflectors between the lift table 26 provided movably to the stacker crane, the reflectors provided to the lift table, and the reference measuring position P set on the fixed side. A ground side controller calculates a position of the stacker crane and a position of the lift table based on distance data derived by the travel distance-measuring unit and the lift distance-measuring unit.

13 Claims, 9 Drawing Sheets

TRAVELING BODY SYSTEM, AUTOMATED STORAGE AND RETRIEVAL SYSTEM, AND METHOD FOR CONTROLLING TRAVELING BODY

BACKGROUND OF THE INVENTION

1. Field of the Invention

The present invention relates to a traveling body system and an automated storage and retrieval system equipped with a distance measuring unit for measuring a position of a traveling body such as a stacker crane (article transporting unit) that takes in and out articles on and from a shelf having article storage sections, for example, or the like, and a method for controlling a traveling body.

2. Description of the Related Art

As shown in FIG. 8 and FIG. 9, in an automated storage and retrieval system in a related art, a working passage 81 is provided to face shelves in which article storage sections are constructed respectively. A stacker crane (article transporting unit) 84 is guided by a floor rail 82 and a ceiling rail 83 to travel reciprocally along a predetermined route on the working passage 81. A ground side controller 85 is positioned at one end portion of the predetermined route and a crane side controller 86 is fitted to the stacker crane 84. A command signal issued from the ground side controller 85 is sent out to the crane side controller 86 via an optical transmission system consisting of an optical transmitter 87a and an optical receiver 87b.

Then, a travel electric motor 88A is driven by a travel control portion 86a in the crane side controller 86 to travel the stacker crane 84. A travel position is sensed via a pulse generator (abbreviated as "PG" hereinafter) 88B of the travel electric motor 88A. Thus, the stacker crane 84 is moved up to a predetermined position. Further, a lift electric motor 89A is driven by a lift control portion 86b of the crane side controller 86 to lift a lift table 90. A height position of the lift table 90 is sensed via a PG 89B of the lift electric motor 89A. Thus, the lift table 90 is moved vertically up to a predetermined height. In addition, a transfer electric motor is driven by a transfer control portion 86c of the crane side controller 86 to take in and out a transfer member of a transfer device 91. A taking-in-and-out position of the transfer member is sensed via a transfer motor PG. Thus, transfer of the article to and from the article storage section is carried out.

However, in the above configuration in the related art, the crane side controller 86 and its assisting devices are fitted to the stacker crane 84. Therefore, there have been demands for a reduction in weight and simplification of the stacker crane 84 and thus a higher-speed operation of the stacker crane 84.

SUMMARY OF THE INVENTION

It is an object of the present invention to provide a traveling body system and an automated storage and retrieval system capable of achieving a reduction in weight and simplification of a traveling body and a higher-speed operation, and a method for controlling a traveling body.

In order to achieve the above object, a traveling body system according to a first aspect of the preset invention comprises:

an optical traveling-body distance-measuring unit having a traveling body measuring instrument provided at a traveling-body measuring position set on a fixed side, the optical traveling-body distance-measuring unit measuring optically a distance from the traveling body measuring instrument to a traveling body, which can travel on a predetermined route, by the traveling body measuring instrument; and a controller provided on the fixed side, for calculating a position of the traveling body, based on distance data obtained by the optical traveling-body distance-measuring unit.

The above-mentioned traveling body system may further comprising:

an optical moving-body distance-measuring unit having a moving body measuring instrument provided at a moving-body measuring position set on the fixed side and a reflecting member provided to the traveling body, the optical moving-body distance-measuring unit measuring optically a distance from the moving body measuring instrument to a moving body, which provided movably to the traveling body, by the moving body measuring instrument via the reflecting member, wherein the controller calculates a position of the moving body, based on distance data obtained by the optical moving-body distance-measuring unit.

According to the above configuration, since the distance to the traveling body is sensed directly by the traveling-body distance-measuring unit on the fixed side and simultaneously the distance to the moving body is sensed directly by the moving-body distance-measuring unit, both the positional data of the traveling body and the positional data of the moving body can be obtained by the controller on the fixed side. Therefore, unlike the related art, there is no necessity to send out the sensed signal sensed by the traveling body to the controller on the fixed side via the transmitting means, and thus position control of the traveling body and the sensed member in the traveling body can be easily carried out by the controller on the fixed side. As a result, since the controller on the traveling body side can be omitted, a reduction in weight and simplification of the traveling body can be achieved and a higher-speed operation can be accelerated.

An automated storage and retrieval system according to a second aspect of the preset invention comprise:

an article storage section for storing an article;

an article transporting unit which can travel on a predetermined route along the article storage section;

an optical traveling-body distance-measuring unit having a traveling body measuring instrument provided at a traveling-body measuring position set on a fixed side, the first distance-measuring unit measuring optically a distance from the traveling body measuring instrument to the article transporting unit by the traveling body measuring instrument; and a controller provided on the fixed side, for calculating a position of the article transporting unit based on measured data obtained by the optical traveling-body distance-measuring unit.

According to the above configuration, the distance to the article transporting unit can be measured by the traveling-body distance-measuring unit at the traveling-body measuring position on the fixed side, and then measured data can be input directly to the controller on the fixed side. Therefore, travel of the article transporting unit can be controlled only by the controller on the fixed side. As a result, since the controller on the article transporting unit side can be omitted, a reduction in weight and simplification of the article transporting unit can be achieved and a higher-speed operation can be accelerated.

An automated storage and retrieval system according to a third aspect of the present invention comprises:

an article storage section for storing an article;

an article transporting unit which can travel on a predetermined route along the article storage section;

an optical traveling-body lower distance-measuring unit having a traveling-body lower measuring instrument provided at a traveling-body lower measuring position set on a fixed side, the optical traveling-body lower distance-measuring unit measuring optically a distance from the traveling-body lower measuring instrument to a lower portion of the article transporting unit by the traveling-body lower measuring instrument;

an optical traveling-body upper distance-measuring unit having a traveling-body upper instrument provided at a traveling-body upper measuring position which is over the traveling-body lower measuring position, the optical traveling-body upper distance-measuring unit measuring optically a distance from the traveling-body upper instrument to an upper portion of the article transporting unit by the traveling-body upper instrument;

a lower travel driving unit provided to the article transporting unit and guided by a floor guiding member along the predetermined route to drive the lower portion of the article transporting unit;

an upper travel driving unit provided to the article transporting unit and guided by a ceiling guiding member along the predetermined route to drive the upper portion of the article transporting unit; and a controller provided on the fixed side, for controlling the lower travel driving unit and the upper travel driving unit, based on measured data obtained by the traveling-body lower distance-measuring unit and the traveling-body upper distance-measuring unit.

According to the above configuration, the positional data and the attitude data of the article transporting unit can be derived by sensing the distance to the article transporting unit at both the traveling-body upper sensing position set on the fixed side and the traveling-body lower sensing position respectively. Thus, if the lower travel driving unit and the upper travel driving unit are controlled by the controller on the fixed side based on these measured data, the article transporting unit can be traveled at a high speed while maintaining its upright attitude. Therefore, since the article transporting unit can be controlled based on the measured data measured on the fixed side, the article transporting unit can be controlled only by the controller provided on the fixed side, and thus the controller on the article transporting unit side can be omitted. As a result, a reduction in weight and simplification of the article transporting unit can be achieved and a higher-speed operation can be accelerated.

In the configuration according to the second or third aspect, an automated storage and retrieval system according to a fourth aspect of the present invention may further comprise:

a lifting body having a transfer unit for transferring the article between the article storage section and lifting body, the lifting body provided vertically movably to the article transporting unit; and an optical moving-body distance-measuring unit having a moving body measuring instrument provided at a moving-body measuring position set on the fixed side and a reflecting member provided to the article transporting unit, the optical moving-body distance-measuring unit measuring optically a distance from the moving body measuring instrument to the lifting body by the moving body measuring instrument, wherein the controller calculates a position of the lifting body, based on measured data obtained by the optical moving-body distance-measuring unit.

According to the above configuration, since position of the article transporting unit is sensed directly by the traveling-body distance-measuring unit and simultaneously position of the measured member provided to the article transporting unit is sensed directly by the moving-body distance-measuring unit. Therefore, unlike the related art, it is not required to send out the sensed signal sensed by the traveling body to the controller on the fixed side via the transmitting means, and thus position control of the traveling body and the moving body can be easily implemented by the controller provided on the fixed side. As a result, since the controller on the traveling body side can be omitted, a reduction in weight and simplification of the traveling body can be achieved and a higher-speed operation can be accelerated.

In the automated storage and retrieval system according to a fifth aspect of the present invention, in the configuration according to the fourth aspect, the moving-body measuring position may be set at a position along the predetermined route, an optical axis of the moving-body distance-measuring unit may be provided along the floor guiding member, and the reflecting member may be provided on a bottom side of the article transporting unit, wherein a distance to the lifting body is measured from a lower side.

According to the above configuration, since the optical axis of the moving-body distance-measuring unit is provided along the floor guiding member, the distance (height position) to the lifting body can be measured stably from the bottom side.

In the automated storage and retrieval system according to a sixth aspect of the present invention, in the configuration according to the fourth aspect, the moving-body measuring position may be set at a position along the predetermined route, an optical axis of the moving-body distance-measuring unit may be provided along the ceiling guiding member, and the reflecting member may be provided on a ceiling side of the article transporting unit, wherein a distance to the lifting body is measured from an upper side.

According to the above configuration, since the optical axis is provided along the ceiling guiding member, the distance (height position) to the lifting body can be measured stably from the top side even when obstacles are present on the floor guiding member side. Thus, the application fields of the present invention can be broadened.

DETAILED DESCRIPTION OF THE INVENTION

Now, a first embodiment of an automated storage and retrieval system according to the present invention will be explained with reference to FIG. 1 to FIG. 4 hereinafter.

Figure 2:
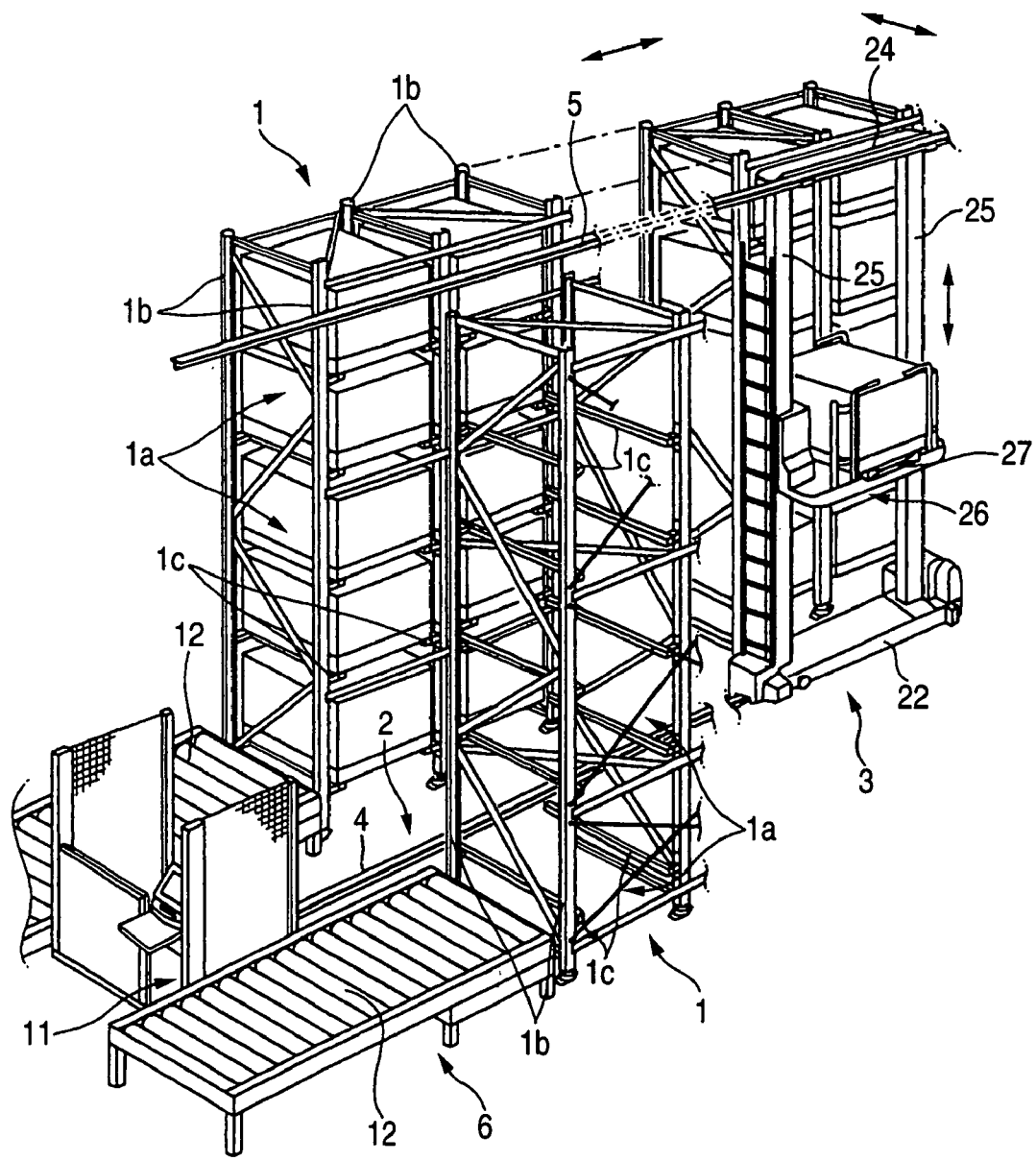
FIG. 2 is a perspective view showing the first embodiment of the automated storage and retrieval system.

As shown in FIG. 2, the automated storage and retrieval system according to the first embodiment of the present invention comprises a pair of right and left frame-like storage shelves 1, and a stacker crane (traveling body/article transporting unit) 3. The pair of right and left frame-like storage shelves 1 are positioned across a working passage 2 such that their directions along which the articles are taken in/out on/from article storage sections 1a are opposed to each other. The stacker crane 3 automatically travels on a predetermined route along the working passage 2.

The storage shelf 1 has struts 1b and arm members 1c. The struts 1b are provided upright at a predetermined pitch in a predetermined route direction on the both of a front side of the working passage 2 and a back side of the working passage 2. The arm members 1c are coupled respectively between the near-side struts 1b and the back-side struts 1b in a multi-stage fashion. Thus, each of the article storage sections 1a is surrounded with four struts 1b and four arm members 1c. The article is stored on the arm members 1c on both sides directly or via a pallet. Where the term "article" described later denote an article itself or a container that can be transferred by a transfer device, or an article and a pallet, or an article contained in a storage container.

A travel rail (floor guiding member) 4 is laid on a floor along the predetermined route of the working passage 2, and also a ceiling rail (ceiling guiding member) 5 is laid on a ceiling along the predetermined route. An article carrying-out portion 6 is provided to one end portion of the working passage 2 on a fixed side. The article carrying-out portion 6A comprises a ground side controller (controller) 11 for issuing a storing/retrieving command to the stacker crane 3 and an article loading table 12.

Figure 3:
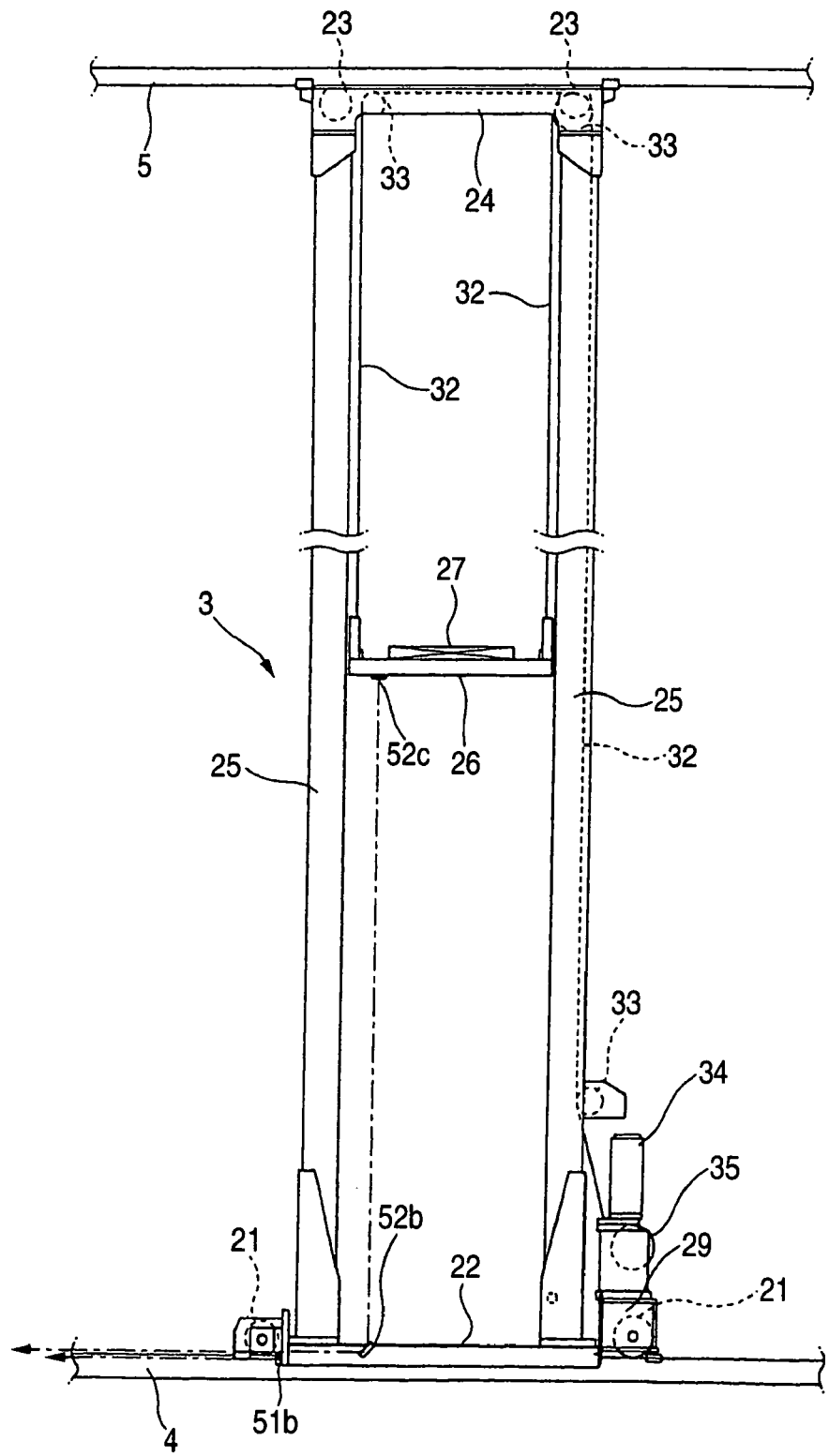
FIG. 3 is a side view showing a stacker crane of the first embodiment of the automated storage and retrieval system.

As shown in FIG. 3, the stacker crane 3 comprises a travel vehicle body 22, an upper frame 24, and a pair of lift masts 25, 25. The travel vehicle body 22 can travel on the travel rail 4 via a plurality of travel wheels 21. The upper frame 24 can travel on the ceiling rail 5 via guide wheels 23. The pair of lift masts 25, 25 are arranged along the predetermined route direction and disposed upright between the travel vehicle body 22 and the upper frame 24. A lift table (moving body/lifting body) 26 is arranged vertically movably between the lift masts 25, 25. A transfer device (transfer unit) 27 is fitted to the lift table 26, and can take in and out the article on and from the article storage section 1a by putting in and out a fork member, for example.

A travel driving unit 28 is provided to the travel vehicle body 22 and revolves/drives one of the travel wheels 21 by a travel electric motor 29 via a reduction gear. Thus, the stacker crane 3 is traveled/driven along the travel rail 4.

A lift driving unit 31 drives vertically the lift table 26. The lift chains 32 are provided along the lift masts 25 side and the lift table 26 is hung down via the lift chains 32. Then, the lift chains 32 are wound onto the winding drum 35, which is revolved/driven by a lift electric motor 34 via a reduction gear, respectively to move upward and downward the lift table 26.

In addition, the transfer device 27 is constructed to put in and out the fork member by a transfer electric motor (not shown) via an access mechanism.

Therefore, the travel electric motor 29 is driven based on the storing/retrieving command, which is issued from the ground side controller 11 to the stacker crane 3, to travel along the travel rail 4, and then causes the lift table 26 to move vertically up to a height that corresponds to the target article storage section 1a. Then, the stacker crane 3 receives the article in the article storage section 1a via the transfer device 27. Then, the stacker crane 3 is moved to article carrying-out portion 6, and then the lift table 26 is positioned to conform with the article loading table 12 and deliver the article to the article loading table 12. In this manner, the article storage sections 1a of the storage shelf 1 and the article loading table 12 are constructed to deliver the article between them.

Figure 4:
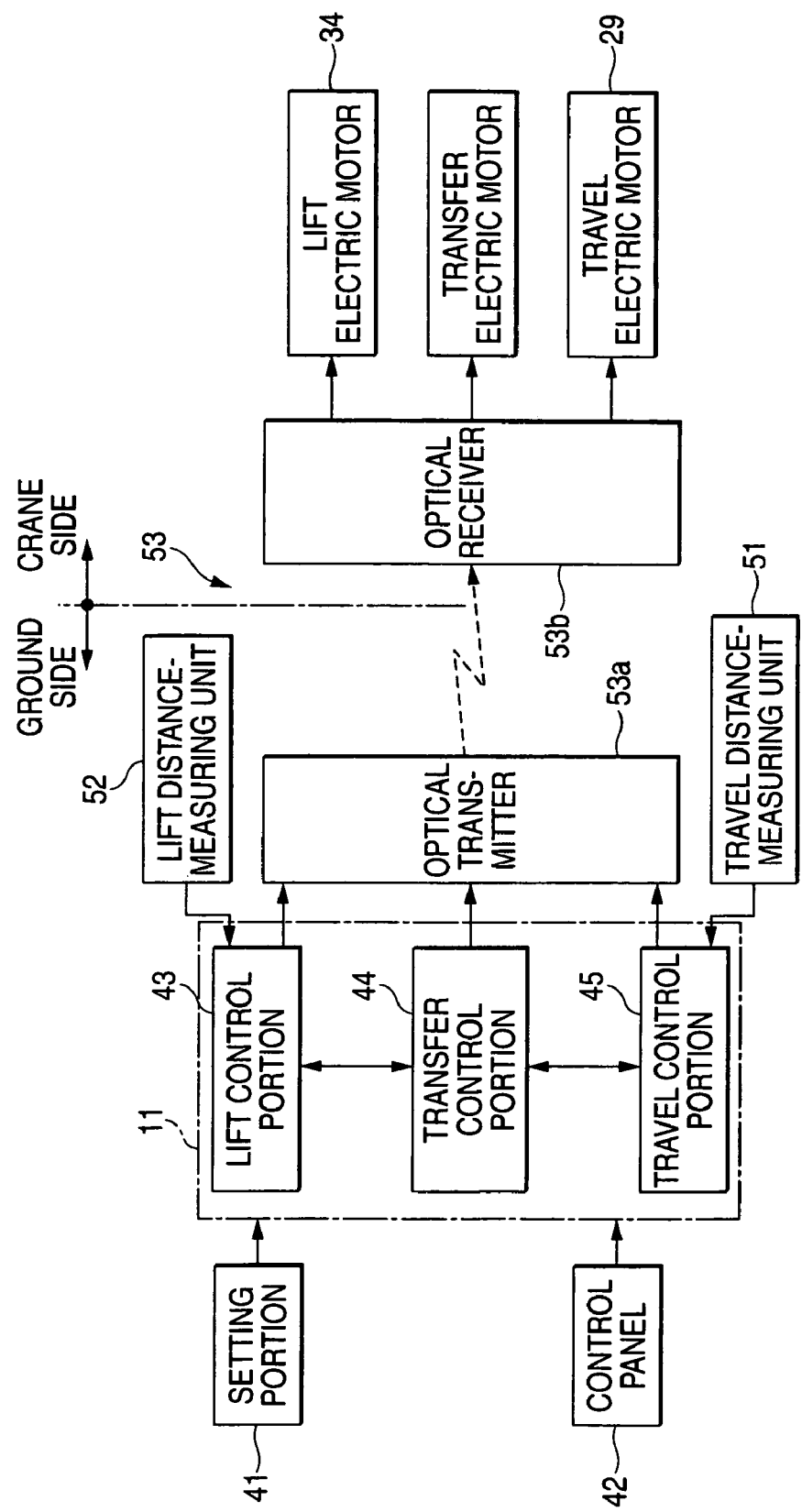
FIG. 4 is a control configurative view showing the first embodiment of the automated storage and retrieval system.

As shown in FIG. 4, the ground side controller 11 receives a setting signal from a setting portion 41 and a storing/retrieving signal from a control panel 42. The ground side controller 11 has a lift control portion 43, a transfer control portion 44, and a travel control portion 45. A travel measuring signal of the stacker crane 3 is input from a travel distance-measuring unit (optical traveling-body distance measuring unit) 51 to the travel control portion 45. A lift measuring signal of the lift table 26 is input from the lift distance-measuring unit (optical moving-body distance measuring unit) 52 to the lift control portion 43. An optical transmission system 53 comprises an optical transmitter 53a of the ground side controller 11 and an optical receiver 53b fitted to the stacker crane 3, and is provided between the ground side controller 11 and the stacker crane 3. Thus, control signals of the ground side controller 11 are transmitted to the stacker crane 3 side via the optical transmission system 53 to control the travel electric motor 29 and the lift electric motor 34, and the transfer electric motor.

Figure 1:
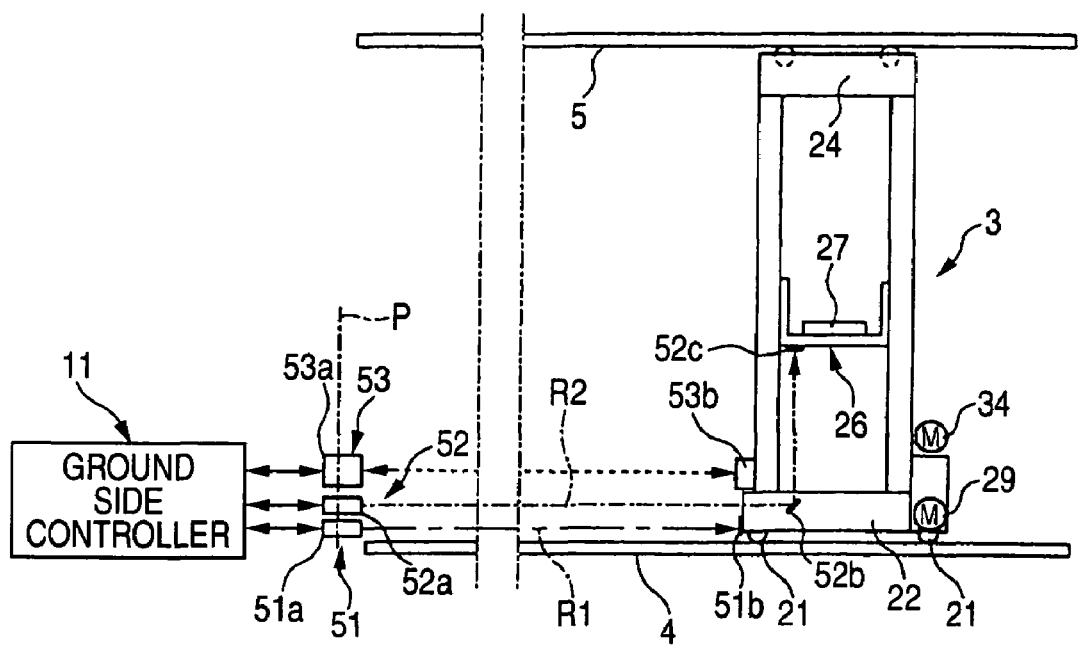
FIG. 1 is a configurative view showing a first embodiment of an automated storage and retrieval system according to the present invention.

As shown in FIG. 1, the travel distance-measuring unit 51 comprises a travel distance-measuring sensor (traveling-body measuring instrument) 51a of laser type, for example, and a travel reflector 51b. The travel distance-measuring sensor 51a is provided at a measuring reference position (traveling-body measuring position/moving-body measuring position) P that is set in vicinity of the ground side controller 11. The travel reflector 51b is provided onto the travel vehicle body 22 of the stacker crane 3. Thus, a laser beam (distance-measuring medium) R1 is projected from the traveling distance-measuring sensor 51a in parallel with and close to the travel rail 4, then reflected by the travel reflector 51b, and then received by the travel distance-measuring sensor 51a to input it into the ground side controller 11. As a result, the travel distance-measuring unit 51 can measure a distance from the measuring reference position P to the stacker crane 3, and thus sense a position of the stacker crane 3.

The lift distance-measuring unit 52 comprises a lift distance-measuring sensor (moving-body measuring instrument) 52a of laser type, for example, a first lift reflector 52b, and a second lift reflector 52c. The lift distance-measuring sensor 52a is provided at the measuring reference position (moving-body measuring position) P. The first lift reflector 52b is provided onto the travel vehicle body 22 of the stacker crane 3, and the second lift reflector 52c is provided onto the lift table 26. Thus, a laser beam (distance-measuring medium) R2 is projected from the lift distance-measuring sensor 52a in parallel with and close to the travel rail 4, then reflected by the first lift reflector 52b, and then reflected by the second lift reflector 52c of the lift table 26 along the lift masts 25. Then, the reflected laser beam R2 is received by the lift distance-measuring sensor 52a via the first lift reflector 52b to input it into the ground side controller 11. Therefore, a distance from the measuring reference position P to the lift table 26 is measured. As a result, a height position of the lift table 26 can be calculated by subtracting the above distance from the position P to the stacker crane 3 from this measured data.

In the above configuration, for example, when the retrieving signal is input from the control panel 42, first the travel command signal is sent out from the travel control portion 45 of the ground side controller 11 to the stacker crane 3 side via the optical transmission system 53, then the travel electric motor 29 is driven, and then the stacker crane 3 is traveled up to the position corresponding to the target article storage section 1a along the travel rail 4. At this time, in the travel distance-measuring unit 51, the measuring laser beam R1 is projected from the travel distance-measuring sensor 51a at the measuring reference position P, and then the laser beam reflected by the travel reflector 51b is received by the travel distance-measuring sensor 51a to input it into the travel control portion 45, so that the position of the stacker crane 3 is controlled. Here, a travel limit position of the stacker crane 3 on the travel rail 4 is derived from the measured data obtained by the travel distance-measuring unit 51.

Then, when the stacker crane 3 is stopped at the target position, a lift command signal is sent out from the lift control portion 43 of the ground side controller 11 to the stacker crane 3 side via the optical transmission system 53, then the lift electric motor 34 is driven, and then the lift table 26 is moved vertically to stop at the position corresponding to the target article storage section 1a of the storage shelf 1. At this time, in the lift distance-measuring unit 52, the measuring laser beam R2 is projected from the lift distance-measuring sensor 52a, and then the laser beam reflected by the first lift reflector 52b and the second lift reflector 52c is received by the lift distance-measuring sensor 52a. Thus, the distance data of the lift table 26 is input into the lift control portion 43 and the position of the lift table 26 is controlled. Here, a lift limit position of the lift table 26 is also derived from the measured data obtained by the lift distance-measuring unit 52.

In addition, a transfer command signal is sent out from the transfer control portion 44 of the ground side controller 11 to the stacker crane 3 side via the optical transmission system 53, then the transfer electric motor is driven, and then the transfer device 27 is driven to put out the article in the target article storage section 1a onto the stacker crane 3.

Similarly, the article picked up by operating the stacker crane 3 is carried to the article carrying-out portion 6, and then carried out onto the article loading table 12.

A carrying-in operation of the articles is carried out in reverse order to the above.

According to the above-mentioned first embodiment, the measured data can be input directly into the ground side controller 11 by sensing the distance to the stacker crane 3 at the measuring reference position P by the travel distance-measuring unit 51, and thus the stacker crane 3 can be driven/controlled only by the ground side controller 11. As a result, since the controller on the stacker crane 3 side can be omitted, a reduction in weight and simplification of the stacker crane 3 can be achieved and a higher-speed operation can be accelerated.

Further, in the travel distance-measuring unit 51, the laser beam R1 is projected from the traveling distance measuring sensor 51a provided at the measuring reference position P on the fixed side to the travel reflector 51b of the stacker crane 3. Therefore, an area of the travel reflector 51b can be widely reduced in contrast to the case that, like the related art, the laser beam is projected from the distance sensor provided to the stacker crane side to the reflector on the fixed side. The reason for this will be given as follows. That is, in the related art, an optical axis of the laser beam is largely swung particularly an oblique swing of the stacker crane rather then a parallel shift of the stacker crane and in proportion to a distance from the distance sensor to the reflector. Thus, a reflecting position on the reflector is largely changed and a wide reflecting surface is required. In contrast, like the present invention, an optical axis of the laser beam R1 projected from the travel distance-measuring sensor 51a at the measuring reference position P on the fixed side is not swung. Thus, a size of a reflecting surface of the travel reflector 51b may be set within a range in which the stacker crane 3 is just swung in its width direction and its vertical direction. The first lift reflector 52b in the lift distance-measuring unit 52 can achieve the same advantage as this advantage.

In addition, the position of the stacker crane 3 is sensed directly by the travel distance-measuring unit 51 and at the same time the position of the lift table 26 provided to the stacker crane 3 is sensed directly by the lift distance-measuring unit 52. Therefore, unlike the related art, it is not required to send out a sensed signal sensed at the stacker crane to the ground side controller via the transmitting means, and thus control of the stacker crane 3 and the lift table 26 can be readily carried out by the ground side controller 11. As a result, since the controller on the stacker crane 3 side can be omitted, a reduction in weight and simplification of the stacker crane 3 can be achieved and a higher-speed operation can be accelerated.

Figure 5:
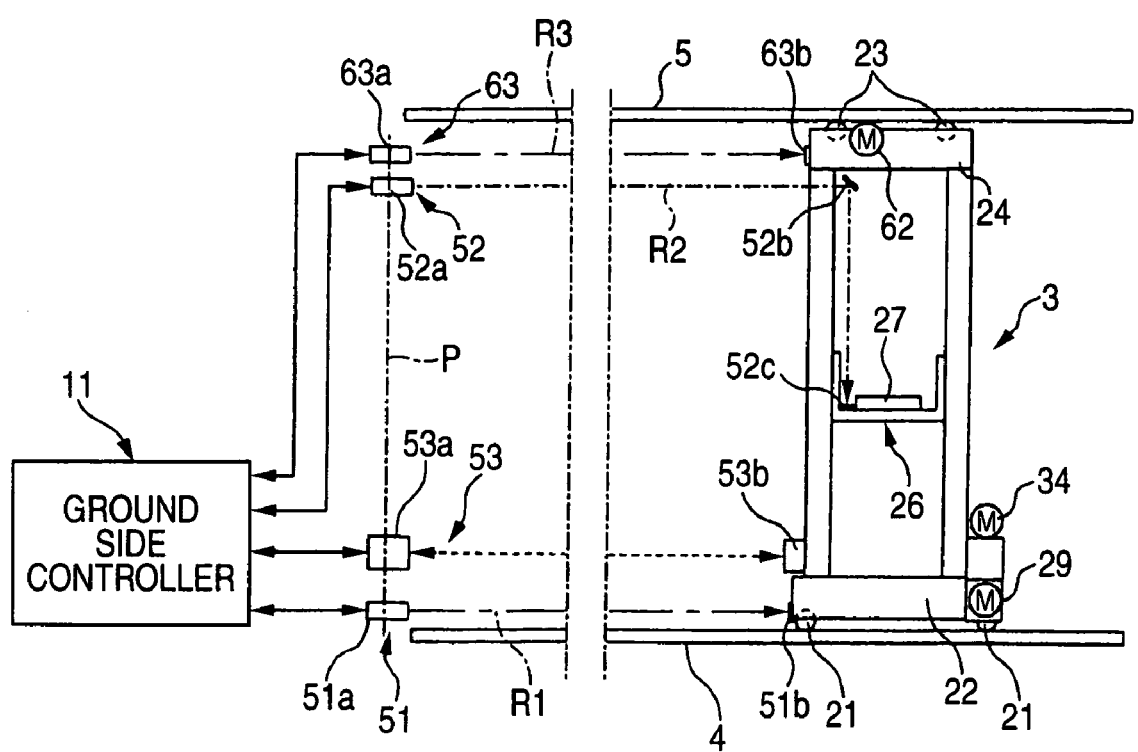
FIG. 5 is a configurative view showing a second embodiment of an automated storage and retrieval system according to the present invention.
Figure 6:
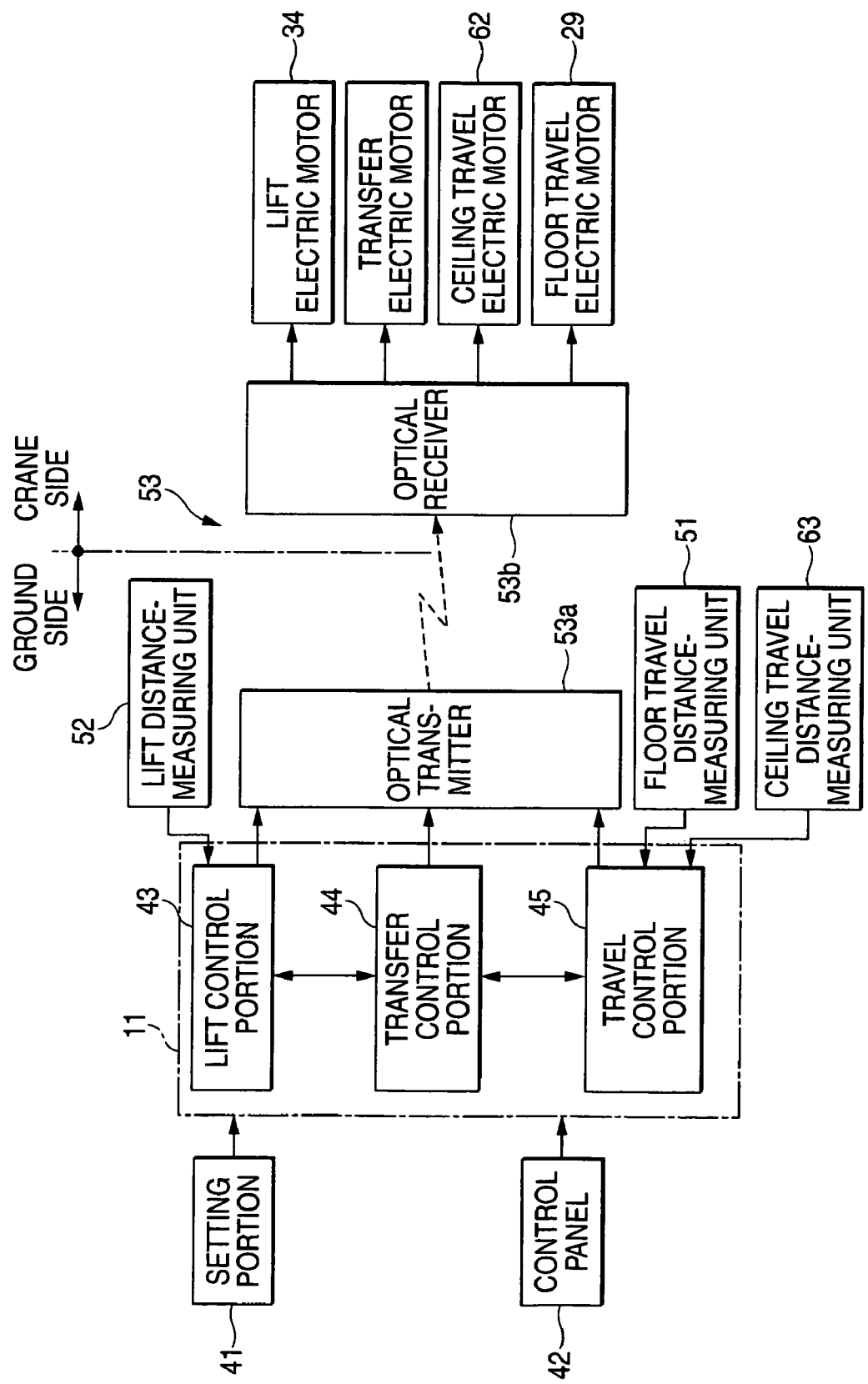
FIG. 6 is a control configurative view showing the second embodiment of the automated storage and retrieval system.

Next, a second embodiment of an automated storage and retrieval system according to present invention will be explained with reference to FIG. 5 and FIG. 6 hereunder. In this case, the same reference symbols are affixed to the same members as those in the first embodiment, and their explanation will be omitted herein.

A stacker crane 3 has a floor travel driving unit 28 in a travel vehicle body 22 and a ceiling travel driving unit 61 in an upper frame 24. The floor travel driving unit 28 revolves/drives one of travel wheels 21 by a floor travel electric motor 29. The ceiling travel driving unit 61 revolves/drives one of guide wheels 23 by a ceiling travel electric motor 62.

A floor travel distance-measuring unit (traveling-body lower travel distance-measuring unit) 51 measures a lower position of the stacker crane 3 by a floor travel distance-measuring sensor (traveling-body lower measuring instrument) 51a provided at a measuring reference position (traveling-body lower measuring position) P. Further, in the automated storage and retrieval system of the second embodiment, a ceiling travel distance-measuring unit (traveling-body upper travel distance-measuring unit) 63 is provided and measures an upper position of the stacker crane 3. The ceiling travel distance-measuring unit 63 comprises a ceiling traveling distance-measuring sensor 63a and a ceiling reflector 63b. The ceiling traveling distance-measuring sensor 63a is provided at an upper position (traveling-body upper measuring position), which is right over the measuring reference position P. The ceiling reflector 63b is provided to the upper frame 24. The ceiling traveling distance-measuring sensor 63a projects a laser beam (distance-measuring medium) R3 along a ceiling rail 5 and then the laser beam R3 reflected by the ceiling reflector 63b is received by the ceiling travel distance-measuring sensor 63a.

A lift distance-measuring unit 52 comprises a lift distance-measuring sensor 52a, a first lift reflector 52b and a second lift reflector 52c. The lift distance-measuring sensor 52a is provided at the upper position over the measuring reference position P. The first lift reflector 52b is provided to the upper frame 24, and the second lift reflector 52c is provided on the lift table 26. The lift distance-measuring sensor 52a projects the laser beam R2 such that its optical axis is extended along the ceiling rail 5, then the laser beam is reflected from the first lift reflector 52b to the second lift reflector 52c, and then the laser beam R2 reflected from the second lift reflector 52c is received by the lift distance-measuring sensor 52a via the first lift reflector 52b.

According to the above configuration, position data and attitude data of the stacker crane 3 are computed by the travel control portion 45 of the ground side controller 11 based on the measured data obtained by the floor travel distance-measuring unit 51 and the ceiling travel distance-measuring unit 63 to indicate respective distances from the measuring reference position P to the reflectors 51b, 63b. Then, the floor travel driving unit 28 and the ceiling travel driving unit 61 are driven/controlled by the ground side controller 11 such that respective distances from the measuring reference position P to the reflectors 51b, 63b can be kept constant. As a result, the stacker crane 3 can be traveled at a high speed while maintaining its upright attitude.

Further, a height of the lift table 26 is measured by forming the optical axis of the laser beam R2 along and near the ceiling rail 5 and forming the optical axis of the reflected beam downward from the upper frame 24. Therefore, even though obstacles lie near the travel rail 4 and the floor and in a space under the lift table 26, the lift distance-measuring unit 52 can be installed and thus the arrangement position of the lift distance-measuring unit 52 can be set widely.

According to the above-mentioned second embodiment, the measured data measured at the measuring reference position P are input directly into the ground side controller 11, and then the floor travel driving unit 28 and the ceiling travel driving unit 61 of the stacker crane 3 can be controlled by the ground side controller 11. As a result, since the controller on the stacker crane 3 side can be eliminated, a reduction in weight and simplification of the stacker crane 3 can be achieved and a higher-speed operation can be accelerated. Further, an area of the ceiling reflector 63b of the ceiling travel distance-measuring unit 63 can be reduced similarly to the above.

Figure 7:
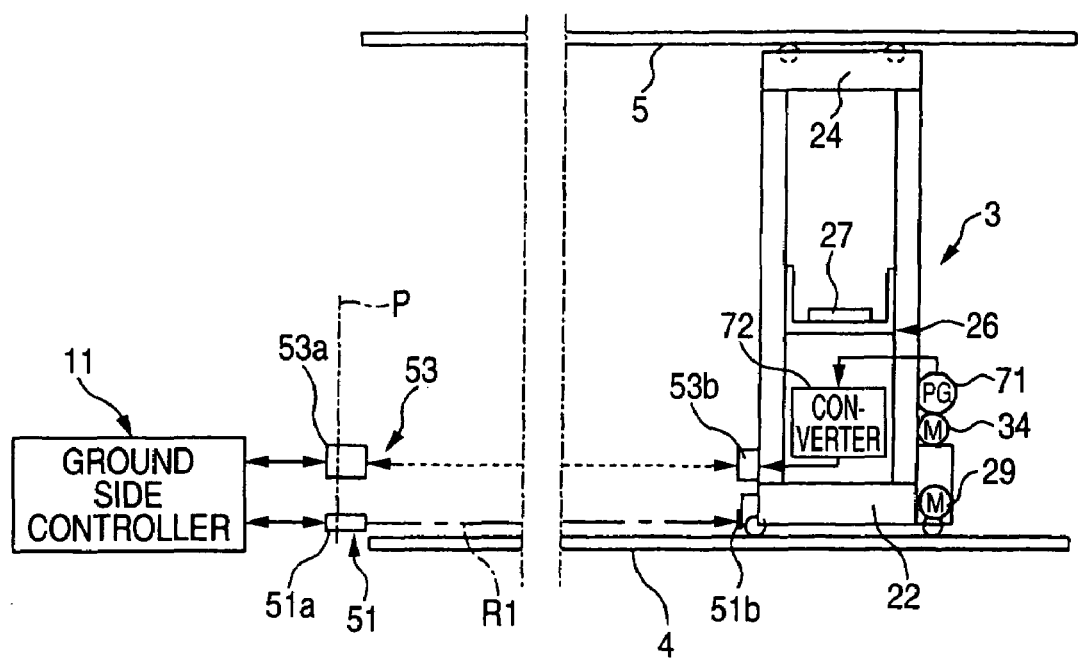
FIG. 7 is a configurative view showing a third embodiment of an automated storage and retrieval system according to the present invention.
Figure 8:
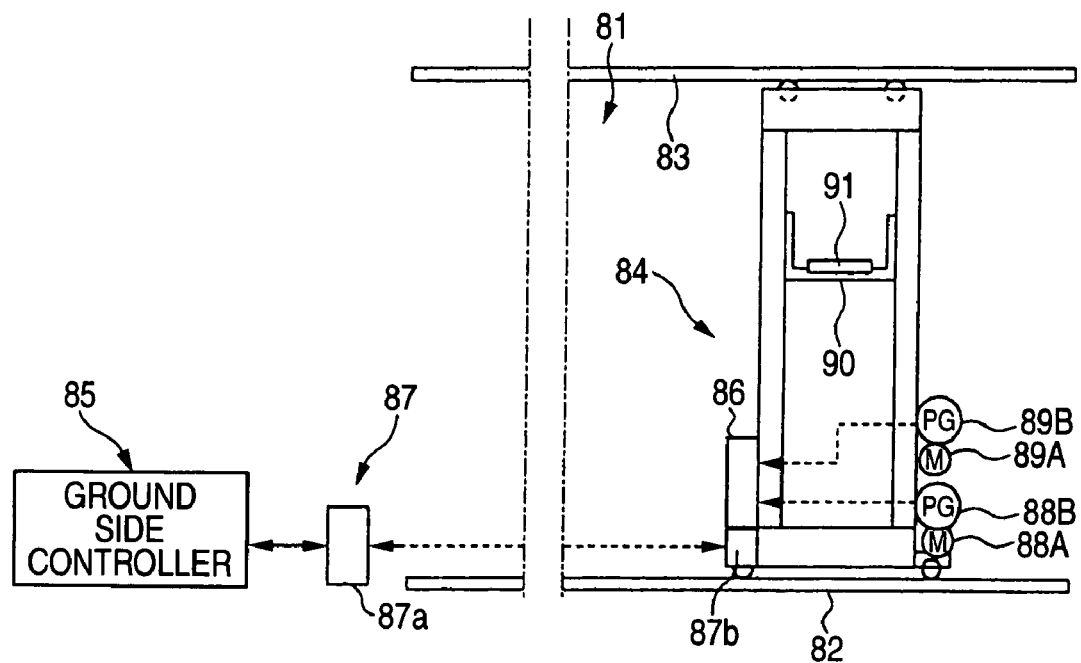
FIG. 8 is a configurative view showing an automated storage and retrieval system in the related art.
Figure 9:
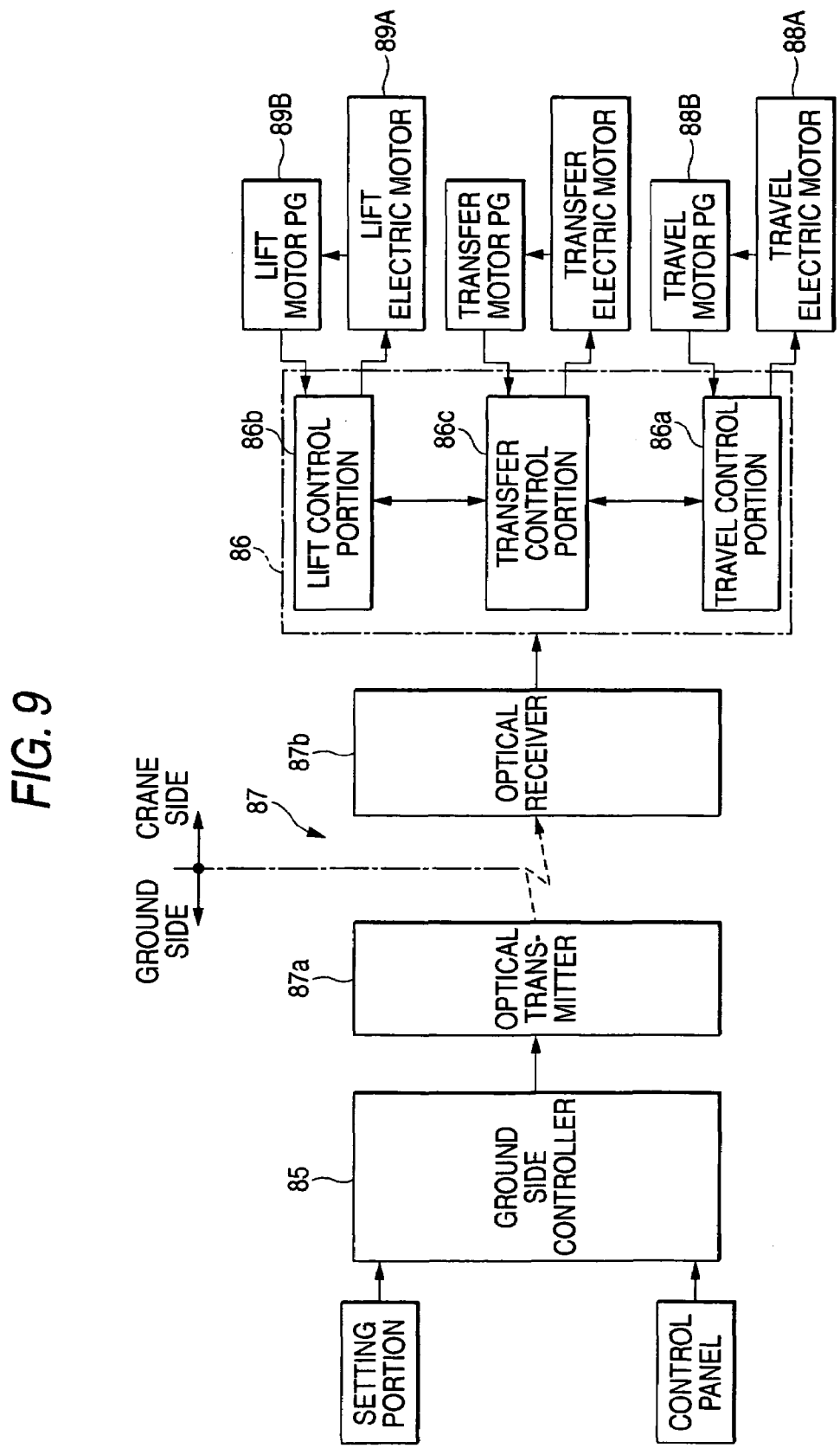
FIG. 9 is a control configurative view showing the automated storage and retrieval system in the related art.

FIG. 7 shows a third embodiment of an automated storage and retrieval system the present invention. The same reference symbols are affixed to the same members as those in the above embodiments, and their explanation will be omitted herein.

In this embodiment, a lift PG 71 is provided to a lift electric motor in place of the lift distance-measuring unit, and then data of the PG 71 are converted by a high-speed converter 72 and transmitted at a high speed to a ground side controller 11 via an optical transmission system 53.

According to the above-mentioned third embodiment, the distance to the stacker crane 3 can be sensed by the travel distance-measuring unit 51 at the measuring reference position P and then the measured data can be input directly into the ground side controller 11, so that the stacker crane 3 can be driven/controlled by the ground side controller 11. As a result, since the controller on the stacker crane 3 side can be omitted, a reduction in weight and simplification of the stacker crane 3 can be achieved and a higher-speed operation can be accelerated.

In this case, in the above-mentioned embodiments, the measuring reference position P at which the distance-measuring units are set is set to the same position (except the height position). In this event, such distance-measuring units may be set at different positions if their positional data are input previously.

Further, in the above-mentioned embodiments, the automated storage and retrieval system is explained. In this event, the present invention can also be applied to the case that, in a transfer system in which a transferring bogie truck caused to automatically travel by the ground side controller is provided and then a working member (moving body) is provided to the transferring bogie truck, positions of the transferring bogie truck and the working member are directly measured by the ground side controller, the case that, in a robot system in which a working robot caused to automatically travel by the ground side controller is provided and then an operating member (moving body) is provided to the working robot, positions of the working robot and the operating member are directly measured by the ground side controller, and so forth.

In addition, in the above-mentioned embodiments, the lift table 26 is arranged in the stacker crane 3 via the lift masts 25 to move vertically. In this event, the lift table 26 may be provided in the form that such lift table 26 is fitted directly to the travel vehicle body 22 via a lift gear.

Further, explanation is made of the stacker crane 3 that delivers the articles between the article storage section 1a of the storage shelf 1 and the article loading table 12 of the article carrying-out portion 6. In this event, the stacker crane 3 can deliver the articles between a plurality of article storage sections 1a. Also, the article carrying-out portion 6 can be constructed such that a plurality of article carrying-out portions are formed on the lowermost stage of the article storage section 1a of the storage shelf 1, for example, and then the articles are taken in and out from the back side. In addition, the articles may be delivered between this article carrying-out portion and the article storage section 1a.

As described above, according to the traveling body system of the first aspect, since the distance to the traveling body is sensed directly by the traveling-body distance measuring unit on the fixed side and simultaneously the distance to the moving body is sensed directly by the moving-body distance-measuring unit, both the positional data of the traveling body and the positional data of the moving body can be obtained by the controller on the fixed side. Therefore, unlike the related art, there is no necessity to send out the sensed signal sensed by the traveling body to the controller on the fixed side via the transmitting means, and thus position control of the traveling body and the sensed member in the traveling body can be easily carried out by the controller on the fixed side. As a result, since the controller on the traveling body side can be omitted, a reduction in weight and simplification of the traveling body can be achieved and a higher-speed operation can be accelerated.

According to the automated storage and retrieval system of the second aspect, the distance to the article transporting unit can be measured by the traveling-body distance-measuring unit at the traveling-body measuring position on the fixed side, and then measured data can be input directly to the controller on the fixed side. Therefore, travel of the article transporting unit can be controlled only by the controller on the fixed side. As a result, since the controller on the article transporting unit side can be omitted, a reduction in weight and simplification of the article transporting unit can be achieved and a higher-speed operation can be accelerated.

According to the automated storage and retrieval system of the third aspect, the positional data and the attitude data of the article transporting unit can be derived by sensing the distance to the article transporting unit at both the traveling-body upper sensing position set on the fixed side and the traveling-body lower sensing position respectively. Thus, if the lower travel driving unit and the upper travel driving unit are controlled by the controller on the fixed side based on these measured data, the article transporting unit can be traveled at a high speed while maintaining its upright attitude. Therefore, since the article transporting unit can be controlled based on the measured data measured on the fixed side, the article transporting unit can be controlled only by the controller provided on the fixed side, and thus the controller on the article transporting unit side can be omitted. As a result, a reduction in weight and simplification of the article transporting unit can be achieved and a higher-speed operation can be accelerated.

According to the automated storage and retrieval system of the fourth aspect, since position of the article transporting unit is sensed directly by the traveling-body distance measuring unit and simultaneously position of the measured member provided to the article transporting unit is sensed directly by the moving-body distance-measuring unit. Therefore, unlike the related art, it is not required to send out the sensed signal sensed by the traveling body to the controller on the fixed side via the transmitting means, and thus position control of the traveling body and the moving body can be easily implemented by the controller provided on the fixed side. As a result, since the controller on the traveling body side can be omitted, a reduction in weight and simplification of the traveling body can be achieved and a higher-speed operation can be accelerated.

According to the automated storage and retrieval system of the fifth aspect, since the optical axis of the moving-body distance-measuring unit is provided along the floor guiding member, the distance (height position) to the lifting body can be measured stably from the bottom side.

According to the automated storage and retrieval system of the sixth aspect, since the optical axis is provided along the ceiling guiding member, the distance (height position) to the lifting body can be measured stably from the top side even when obstacles are present on the floor guiding member side. Thus, the application fields of the present invention can be broadened.

What is claimed is:

1. A traveling body system comprising:
    an optical traveling-body distance-measuring unit having a traveling body measuring instrument provided at a traveling-body measuring position which is fixed, the optical traveling-body distance-measuring unit optically measuring a distance from the traveling body measuring position to the traveling body by the traveling body measuring instrument;
    a controller having a fixed position for calculating a position of the traveling body based on distance data obtained by the optical traveling-body distance-measuring unit;
    a control signal transmitter optically transmitting control signals to the traveling body that controls the movement of the traveling body; and
    an optical moving-body distance-measuring unit having a moving body measuring instrument provided at a moving-body measuring position which is fixed, and a reflecting member provided on the traveling body, the optical moving-body distance-measuring unit optically measuring a distance from the moving body measuring instrument to a moving body, which is movably provided on the traveling body, by the moving body measuring instrument via the reflecting member,
    wherein said transmitter generates said control signals based on the position of the traveling body, and
    wherein the controller calculates a position of the moving body, based on distance data obtained by the optical moving-body distance-measuring unit.

2. An automated storage and retrieval system comprising:
    an article storage section for storing an article;
    an article transporting unit which travels a predetermined route along the article storage section;
    an article traveling-body distance-measuring unit having a traveling body measuring instrument provided at a traveling-body measuring position which is fixed, the optical traveling-body distance-measuring unit optically measuring a distance from the traveling body measuring position to the article transporting unit by the traveling body measuring instrument;
    a controller having a fixed position for calculating a position of the article transporting unit based on measured data obtained by the optical traveling-body distance-measuring unit; and
    an optical control signal transmitter optically transmitting control signals to the article transporting unit that controls the movement of the article transporting unit,
    wherein said transmitter generates said control signals based on the position of the article transporting unit.

3. The automated storage and retrieval system according to claim 2, further comprising:
    a lifting body having a transfer unit for transferring the article between the article storage section and lifting body, the lifting body provided vertically movably to the article transporting unit; and
    an optical moving-body distance-measuring unit having a moving body measuring instrument provided at a moving-body measuring position which is fixed and a reflecting member provided to the article transporting unit, the optical moving-body distance-measuring unit optically measuring a distance from the moving body measuring instrument to the lifting body by the moving body measuring instrument,
    wherein the controller calculates a position of the lifting body, based on measured data obtained by the optical moving-body distance-measuring unit.

4. The automated storage and retrieval system according to claim 3, wherein the moving-body measuring position is set at a position along the predetermined route, an optical axis of the moving-body distance-measuring unit is provided along a floor guiding member, and the reflecting member is provided on a bottom side of the article transporting unit, wherein a distance to the lifting body is measured from a lower side.

5. The traveling body system according to claim 1, wherein the controller calculates a position of the moving body based on distance data obtained by the optical moving-body distance-measuring unit and the optical traveling-body distance-measuring unit.

6. The automated storage and retrieval system according to claim 3, wherein the controller calculates a position of the lifting body based on measured data obtained by the optical moving-body distance-measuring unit and the optical traveling-body distance-measuring unit.

7. The traveling body system according to claim 1, wherein the traveling-body measuring position and the moving-body measuring position are located at approximately the same position.

8. The automated storage and retrieval system according to claim 2, wherein the traveling-body measuring position and the moving-body measuring position are located at approximately the same position.

9. The traveling body system according to claim 1, wherein the reflecting member reflects a measurement transmission from the moving body measuring instrument in a direction approximately orthogonal to the predetermined route of the traveling body.

10. The automated storage and retrieval system according to claim 2, wherein the reflecting member reflects a measurement transmission from the moving body measuring instrument in a direction approximately orthogonal to the predetermined route of the traveling body.

11. The traveling body system according to claim 1, further comprising:

a transfer device movably provided on the moving body.

12. The traveling body system according to claim 1, wherein a position of said traveling body is sensed directly by the traveling-body distance-measuring unit.

13. The traveling body system according to claim 1, wherein said control signals remotely control the motion of the traveling body.

* * * * *